Patented Oct. 1, 1929

1,729,708

UNITED STATES PATENT OFFICE

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS

RUBBER COMPOSITION

No Drawing. Application filed December 14, 1927, Serial No. 240,082. Renewed May 11, 1929.

The invention relates to an improvement in rubber compositions.

The object of the invention is to provide a reclaimed rubber possessing the desirable property of plasticity by which it may be easily worked or united with other bases by ordinary means. Especially is it my object to provide proper plasticity in a reclaimed rubber obtained from materials ordinarily hard to handle, such as a whole tire reclaim.

The object of the invention is obtained by compounding with the rubber cleavage products from the hydrolytic decomposition of ox blood (albumen) and which compounding is effected by an alkaline process having a hydrolytic action which renders the ox blood and its hydrolyzed products soluble.

The compounding of the cleavage products with the rubber is best attained by adding to the rubber scrap to be reclaimed, by an alkaline process having a hydrolytic action, ox blood. About four per cent by weight of the ox blood is preferably added to the finely ground rubber scrap. The ordinary alkaline process of devulcanization is then carried on which acts to bring about a hydrolysis of the ox blood by the hot caustic solutions after the blood has first been rendered soluble by the alkaline incident to the process.

Having thus fully described my invention, I claim and desire to secure by Letters Patent of the United States:—

1. Reclaimed rubber having cleavage products from the hydrolytic decomposition of ox blood compounded with it by an alkaline process having a hydrolytic action which renders the ox blood and its hydrolyzed products soluble.

2. Reclaimed rubber, obtained from vulcanized rubber scrap by a devulcanizing process having an alkaline hydrolytic action, having cleavage products from the hydrolytic decomposition of ox blood compounded with it during the period of devulcanization of the rubber scrap from which the reclaim is made.

CHARLES H. CAMPBELL.